Nov. 23, 1965  F. W. HOTTENROTH ETAL  3,219,024
FORCED DRAFT SOLID CARBON FUEL BURNING HEATER
Filed Sept. 23, 1963  2 Sheets-Sheet 2
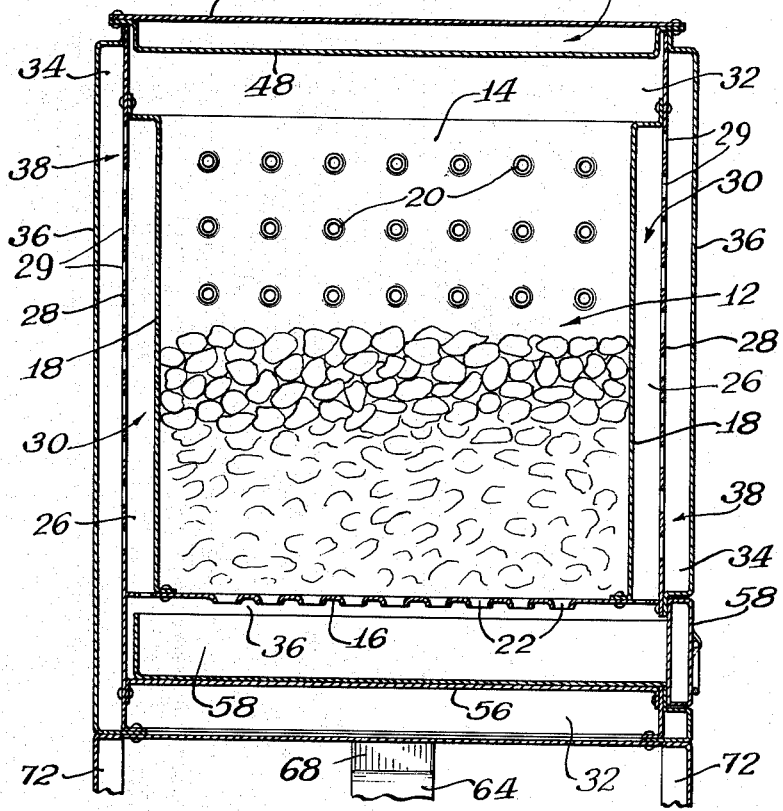
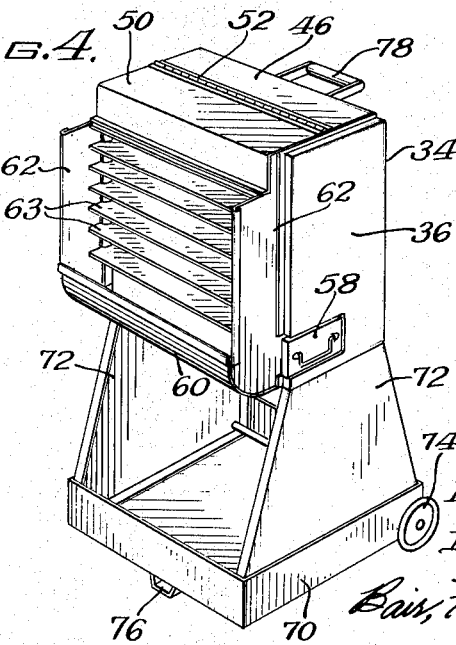
Inventors:
Frederick W. Hottenroth
Harry D. Jacoby
By Bair, Freeman & Molinare
Attys.

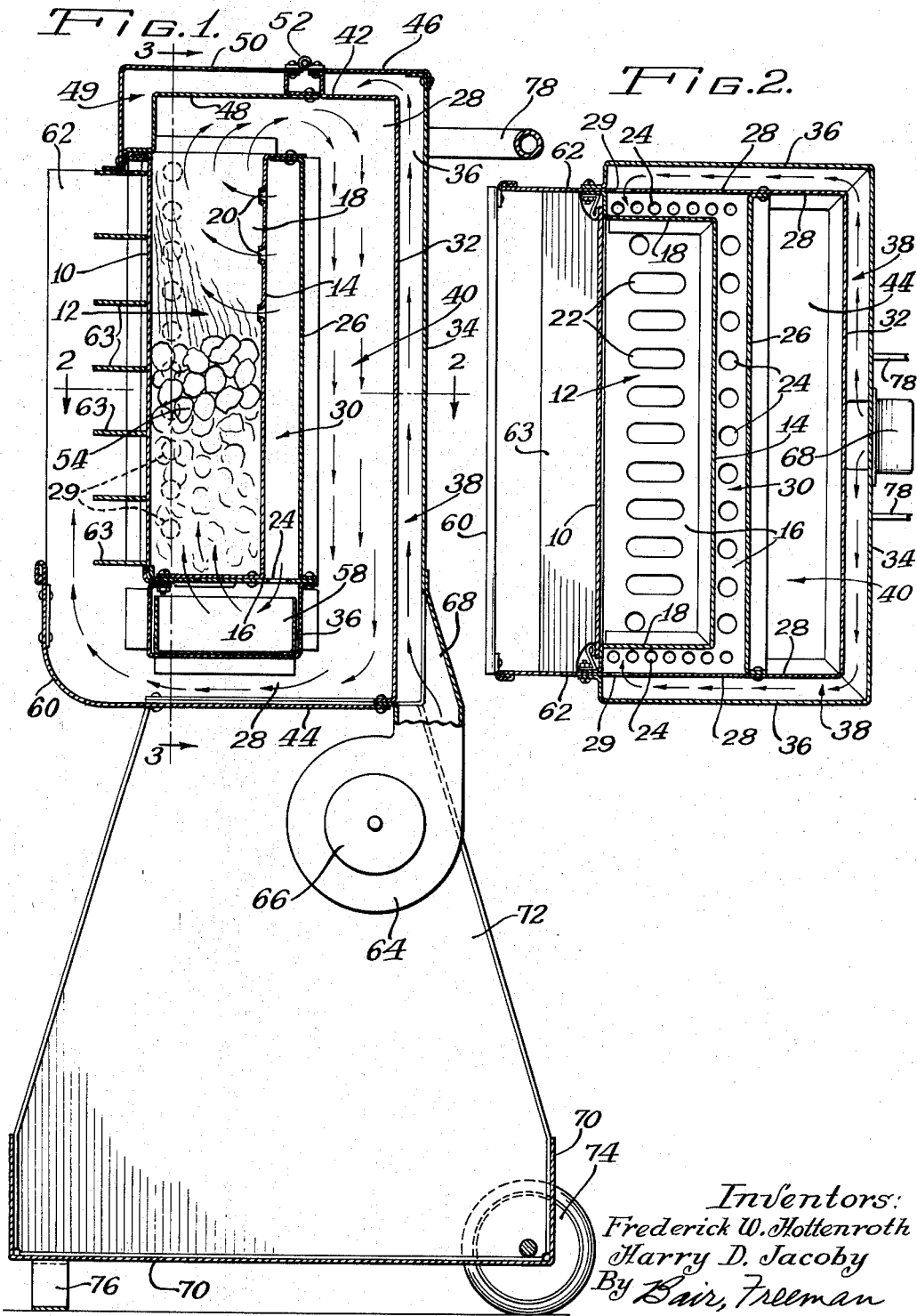

United States Patent Office 3,219,024
Patented Nov. 23, 1965

3,219,024
FORCED DRAFT SOLID CARBON FUEL
BURNING HEATER
Frederick W. Hottenroth, Palos Verdes Peninsula, and
Harry D. Jacoby, Palos Verdes Estates, Calif., assignors
to Z.Z. Corp., Compton, Calif., a corporation of
California
Filed Sept. 23, 1963, Ser. No. 310,701
11 Claims. (Cl. 126—75)

This invention relates to a heater which burns charcoal, petroleum coke and other solid carbon fuels and has means to provide forced draft therefor.

One object of the invention is to provide a radiant type of heater which utilizes solid carbon fuels under forced draft as the fuel source, the heat generated by the combustion of the solid carbon fuels being concentrated on a radiating surface such as stainless sheet steel that is heated to temperatures in the order of magnitude of 1500° to 1900° F. which is in a good infrared emission range.

Another object is to provide the radiating surface in the form of a vertical plate so that the radiant heat energy therefrom is directional and can be aimed as desired wherever heat is necessary, the heater being in the form of a light mobile unit to facilitate such aiming.

Another object is to provide a heater for swimming pool or patio, for campers, sportsmen and construction workers, or for keeping concrete from freezing, for drying plaster, for keeping workmen comfortable and for warming farm animals if desired.

Still another object is to provide a heater having an arrangement of baffle walls that promotes efficient combustion of solid carbon fuels and extracts the maximum amount of heat therefrom, most of which is concentrated on the heat radiating plate.

A further object is to provide a heater of the character disclosed formed of sheet metal in which a combustion chamber is located behind a radiant heating plate and is adapted to be partly filled with solid carbon fuel, a secondary jacket being provided around the combustion chamber and a primary jacket around the secondary jacket, means being provided for forcing air through the primary jacket and then through the secondary jacket and from the secondary jacket into the combustion chamber for both preheating the air and cooling the walls whereby a light-weight, compact, readily portable heater is provided.

Still a further object is to provide passageway means for conducting the air from the secondary jacket so that part of it passes through openings in the bottom of the combustion chamber and part of it passes through openings in the back thereof above the charcoal therein and is discharged toward the radiant heating plate.

An additional object is to provide means for conducting the gases of combustion from the top of the combustion chamber between certain portions of the primary and secondary jackets for preheating the air in both jackets, which gases are then discharged upward in front of louvers which are immediately in front of the radiant heating plate thus preventing cold winds from contacting and cooling the plate.

Another additional object is to provide the secondary jacket extending around the back and two sides of the combustion chamber, and the primary jacket extending around the back and two sides of the secondary jacket, with the back portion of the primary jacket spaced rearwardly from the back portion of the secondary jacket to provide the space through which gases of combustion from the top of the combustion chamber may flow for preheating the air in the primary and secondary jackets.

Still another additional object is to provide an ash receptacle below the combustion chamber through which flows the air from the secondary chamber to the bottom of the combustion chamber, the gases of combustion after preheating air in the primary and secondary jackets flowing under the ash receptacle and then upwardly across the face of the louvers in front of the radiant heating plate.

With these and other objects in view, our invention consists in the construction, arrangement and combination of the various parts of our forced draft solid carbon fuel burning heater, whereby the objects above contemplated are attained, as hereinafter more fully set forth, pointed out in our claims and illustrated in detail on the accompanying drawing, wherein:

FIG. 1 is a vertical fore and aft sectional view of a forced draft solid carbon fuel burning heater embodying our invention;

FIG. 2 is a horizontal sectional view on the line 2—2 of FIG. 1;

FIG. 3 is a vertical sectional view on the line 3—3 of FIG. 1, and

FIG. 4 is a perspective view of our heater.

On the accompanying drawings we have used the reference numeral 10 to indicate a radiant heating plate formed preferably of stainless steel or other high temperature resistant metals or ceramic coated metals. A combustion chamber 12 is located immediately behind the plate 10 and comprises a back wall 14, a bottom wall 16 and side walls 18, the combustion chamber being open at the top as shown in FIG. 1. The back wall 14 is provided with openings 20 and the bottom wall 16 is provided with openings 22 into the combustion chamber 12. Other openings 24 in the bottom wall 16 are for the purpose of permitting air flow to the openings 22.

Back of the wall 14 is another wall 26 as shown in FIG. 1 and beyond the walls 18 are other walls 28 as shown in FIG. 2. The four walls just mentioned provide a secondary jacket 30 for air preheating purposes which is U-shaped as viewed in FIG. 2. Behind the walls 14 and 26 are further walls 32 and 34 and outside the walls 28 are further walls 36 as shown in FIGS. 1 and 2. The walls 28, 32, 34 and 36 form a primary jacket 38 which is U-shaped as viewed in FIG. 2 while the space between the walls 26, 28 and 32 forms a rectangular preheating chamber 40. The chamber 40 has a top wall 42 and a bottom wall 44, and the primary jacket 38 has a top wall 46. In FIGS. 1 and 3 lid walls 48 and 50 form a lid which is hinged at 52 and includes an air space 49. The lid 48–50 may be opened for replenishing the supply of fuel shown at 54 in FIG. 1.

Below the bottom wall 16 is a channel-shaped support 56 for an ash drawer 58, and in front of the channel 56 a curved wall 60 is provided as shown in FIG. 1 for directing combustion gases as will hereinafter appear. The curved wall 60 is provided with a pair of side walls 62 as shown in FIGS. 1, 2 and 4 which support a series of louvers 63.

Means is provided for forcing air through the heater as shown by arrows in FIGS. 1 and 2 comprising a blower 64 and means for operating the same such as an electric motor 66. The blower has a discharge nozzle 68 leading through an opening 69 into the primary jacket 38.

For supporting the heater thus far described, any suitable structure may be provided. We have illustrated a sheet metal box-like member 70 in FIGS. 1 and 4 having side brackets 72 on the upper ends of which the heater is mounted. The member 70 is provided with wheels 74 and a foot 76, and the housing for the heater is provided with a handle 78, all for convenience in transporting the heater manually from one position to another and for directing the heat therefrom.

Practical operation

In the operation of our heater the combustion chamber 12 is partially filled with a solid carbon fuel such as charcoal 54 illustrated in FIGS. 1 and 3. The ash drawer 58 is then removed and a small roll of lighted paper is placed inside the drawer and the drawer returned to its normal position. The motor 66 is then energized for providing forced draft as indicated by the arrows in FIGS. 1 and 2, first from the discharge nozzle 68 of the blower into the outer or primary combustion chamber which air then flows through the openings 29 into the secondary chamber. Part of this air in the secondary chamber flows through the openings 20 in the back wall 14 and part through the openings 24 and 22 into the bottom of the combustion chamber for supplying the burning paper and charcoal with oxygen for starting and maintaining the fire. In passing from the openings 24 to the openings 22 the air flows through the ash drawer 58 as shown in FIG. 1.

The gases of combustion from the top of the combustion chamber 12 pass as shown by arrows in FIG. 1 through the preheating chamber 40, then under the ash drawer 58 and are deflected upwardly by the wall 60 to discharge in front of the louvers 63.

The incoming combustion air cools the outer walls of the heater to a safe temperature and at the same time extracts heat from the combustion gases coming out of the top of the combustion chamber and flowing through the preheating chamber 40. This, in turn, heats the incoming combustion air to a temperature above the flash point of the volatile gases given off by the solid carbon fuel so that as this hot air is introduced through the openings 20 in the back of the combustion chamber it immediately combines with these volatiles thereby creating complete combustion as well as causing the resulting hot gases to impinge upon the inner surface of the plate 10 because of the openings discharging toward the plate. This raises the temperature of the radiant plate to one which causes it to emit infrared energy from its outer surface (the left hand surface in FIG. 1). A portion of the same superheated combustion air is forced down into the ash drawer and up through the bottom of the combustion chamber to burn the charcoal therein, thereby greatly increasing the efficiency of heat output. The preheating chamber 40 thus permits extraction of heat from the hot gases by the incoming combustion air in both the primary and secondary jackets which is usually wasted by solid fuel heating devices.

It will be noted that our heater is so constructed that incoming combustion air passes first through the primary jacket and then the secondary jacket, both of which surround three sides of the combustion chamber. The walls of these jackets are thereby being cooled as the air is being heated. This cooling of the walls around the combustion chamber enables us to fabricate our heater from normal high temperature sheet steels where previously grates for solid carbon fuels have required cast iron as a material which has a reasonable life span under high temperature conditions. Similarly, the combustion chamber has previously required a thick heavy refractory lining. By eliminating the necessity for using cast iron grates and a refractory lining we provide a heater which has a high burning rate to weight ratio and can therefore be made light-weight, compact and portable.

We have found that briquetted lignite and briquetted coal dust as well as compressed wood waste are satisfactory fuels for burning in our heater. Petroleum coke burns quite well although in takes a little longer to ignite than charcoal. It is our intention that "solid carbon fuel" be considered a generic term in our claims for any fuel which will burn satisfactorily in our heater.

The louvers 63 in front of the radiant heating plate 10 have proven to be a very important feature. The exhaust gases passing up in front of the louvers permit the louvered area to remain full of still hot air. The combination of two layers of hot air and hot gases in the jackets of the heater and these louvers prevent all but very strong winds from reaching the radiant heating plate to reduce its temperature, thus effecting important economies of fuel consumption.

From the foregoing specification it will be obvious that most of the heat output from our heater is in the nature of infrared radiant heating energy. All of this energy is emitted from one surface which may be flat as disclosed, parabolic or some other geometric shape that would tend to direct or concentrate the heat over only the specific objects that are to be heated. Utilizing the normally wasted heat in the hot exhaust gases to preheat the combustion air increases the amount of heat energy available in the infrared temperature range, thereby using the combustion air to keep the outer shell or the non-heating surfaces at a much cooler and safer temperature than is usually found in solid fuel heating devices.

The rate of heat output may be easily controlled by controlling the input of combustion air. This can be done either by dampers, by varying the current to the motor 66, or by a thermostat that controls the operation of the motor. No installation is required either indoors or outdoors and the power requirement for the motor 66 is low so that it can be economically driven from an automobile battery or dry cells. Our heater uses a fuel which is easy to handle and safe to store, and is not affected by wind since the radiant energy is transmitted like heat from the sun. The lid 48–50 has the air space 49 to prevent the lid from emitting heat and provides a convenient means for gaining access to the combustion chamber 12 for replenishing the charcoal therein.

Some changes may be made in the construction and arrangement of the parts of our forced draft solid carbon fuel burning heater without departing from the real spirit and purpose of our invention, and it is our intention to cover by our claims any modified forms of structure or use of mechanical equivalents which may reasonably be included within their scope.

We claim as our invention:

1. In a heater of the character described, a substantially vertical radiant heating plate, means for heating said plate comprising a combustion chamber associated with said plate in such manner that said plate forms an exposed outer front wall of said combustion chamber, said combustion chamber being adapted to be partly filled with solid carbon fuel, said combustion chamber having openings in the bottom thereof, a secondary jacket around the outside of said combustion chamber, a primary jacket around the outside of said secondary jacket, said secondary jacket having a portion spaced from said primary jacket to form a preheating chamber, means for forcing air through said primary jacket and then through said secondary jacket and from said secondary jacket into said combustion chamber through said openings in the bottom thereof, and means for conducting the gases of combustion from the top of said combustion chamber through said preheating chamber for preheating air in both jackets.

2. A heater in accordance with claim 1 wherein said secondary jacket extends around the back and two sides of said combustion chamber, said primary jacket extends around the back and two sides of said secondary jacket and the back portion of said primary jacket is spaced rearwardly from the back portion of said secondary jacket to provide said preheating chamber.

3. A heater in accordance with claim 1 wherein an ash receiver is provided below said combustion chamber communicating therewith through said openings in the bottom thereof and with said secondary jacket through which flows the air from said secondary jacket to said combustion chamber.

4. A heater in accordance with claim 3 wherein louvers are provided projecting forwardly from said radiant heating plate and a passageway is provided under said ash receiver and has an inlet end communicating with said preheating chamber and an outlet end adjacent the lower edge of said radiant heating plate, the gases of combustion, after flow through said preheating chamber, flowing through said passageway and then upwardly across the front of said louvers to assist in preventing strong winds from contacting and lowering the temperature of said radiant heating plate.

5. A heater in accordance with claim 1 wherein a lid is provided for said combustion chamber which is spaced from the upper end of the combustion chamber to permit the flow of the gases of combustion therefrom and which has an air space therein to prevent emission of radiant heat therefrom.

6. In a heater of the character described, a substantially vertical radiant heating plate, means for heating said plate comprising a combustion chamber behind said plate and adapted to be partly filled with solid carbon fuel, said combustion chamber having openings in the bottom thereof and openings in the back thereof, a secondary jacket around the outside of said combustion chamber, a primary jacket around the outside of said secondary jacket, said secondary jacket having a portion spaced from said primary jacket to form a preheating chamber, means for forcing air through said primary jacket and then through said secondary jacket and from said secondary jacket into said combustion chamber through said openings in the bottom thereof, and also through said openings in the back thereof above the fuel therein and toward said radiant heating plate, and means for conducting the gases of combustion from the top of said combustion chamber downwardly through said preheating chamber for preheating air in both jackets.

7. A heater in accordance with claim 6 wherein means is provided for discharging the gases of combustion from said preheating chamber across the face of said radiant heating plate.

8. A heater in accordance with claim 7 wherein louvers are provided projecting forwardly from said radiant heating plate across the front edges of which said gases of combustion flow.

9. A heater in accordance with claim 7 wherein said combustion chamber has side walls extending rearwardly from said radiant heating plate and a back wall connecting the rear edges of said side walls, a secondary jacket extends around said side and back walls, said primary jacket extends around the back and two sides of said secondary jacket and the back portion of said primary jacket is spaced rearwardly from the back portion of said secondary jacket to provide said preheating chamber.

10. A heater in accordance with claim 6 wherein an ash receiver is provided below said combustion chamber, louvers are provided projecting forwardly from said radiant heating plate, and means is provided forming a passage under said ash receiver communicating with said preheating chamber and having an outlet adjacent the lower edge of said radiant heating plate to conduct the gases of combustion from said preheating chamber and cause it to flow under said ash receiver and then upwardly across the front edges of said louvers.

11. A heater in accordance with claim 7 wherein a lid is provided for said combustion chamber which is spaced from the upper end of the combustion chamber to permit the flow of the gases of combustion therefrom and which has an air space therein to prevent emission of radiant heat therefrom.

References Cited by the Examiner

UNITED STATES PATENTS

| 808,607 | 12/1905 | Hammond | 126—77 |
| 2,190,343 | 2/1940 | Town | 126—75 |
| 2,344,328 | 3/1944 | Schrage | 110—1 |

FOREIGN PATENTS

| 479,039 | 7/1929 | Germany. |
| 42,478 | 2/1926 | Norway. |
| 42,479 | 2/1926 | Norway. |

FREDERICK L. MATTESON, JR., *Primary Examiner.*

JAMES W. WESTHAVER, *Examiner.*